United States Patent
Wondrasek et al.

(10) Patent No.: US 11,248,475 B2
(45) Date of Patent: *Feb. 15, 2022

(54) DAMPER STACKS FOR TURBOMACHINE ROTOR BLADES

(71) Applicant: General Electric Company, Schenectady, NY (US)

(72) Inventors: Michael Anthony Wondrasek, Greenville, SC (US); Brian Denver Potter, Greer, SC (US); Robert Alan Brittingham, Greer, SC (US)

(73) Assignee: General Electric Company, Schenectady, NY (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/709,050

(22) Filed: Dec. 10, 2019

(65) Prior Publication Data

US 2021/0172326 A1 Jun. 10, 2021

(51) Int. Cl.
| | |
|---|---|
| *F01D 5/26* | (2006.01) |
| *F01D 5/22* | (2006.01) |
| *F01D 11/00* | (2006.01) |
| *F01D 25/06* | (2006.01) |

(52) U.S. Cl.
CPC .............. *F01D 5/22* (2013.01); *F01D 5/26* (2013.01); *F01D 11/008* (2013.01); *F01D 25/06* (2013.01); *F05D 2220/323* (2013.01); *F05D 2240/30* (2013.01); *F05D 2240/80* (2013.01); *F05D 2260/96* (2013.01)

(58) Field of Classification Search
CPC . F01D 5/22; F01D 5/26; F01D 11/008; F01D 25/06; F05D 2220/323; F05D 2240/30; F05D 2260/96; F05D 2240/80
See application file for complete search history.

(56) References Cited

U.S. PATENT DOCUMENTS

| | | | | |
|---|---|---|---|---|
| 5,820,343 | A * | 10/1998 | Kraft | F01D 5/16 416/96 A |
| 7,121,801 | B2 * | 10/2006 | Surace | F01D 5/16 416/193 A |
| 7,163,376 | B2 | 1/2007 | Itzel et al. | |

(Continued)

FOREIGN PATENT DOCUMENTS

| | | |
|---|---|---|
| JP | 2014/084676 A | 5/2014 |
| JP | 2019173650 A | 10/2019 |
| WO | WO2017/123206 A1 | 7/2017 |

OTHER PUBLICATIONS

European Search Report Corresonding to Application No. 20209648 dated Apr. 14, 2021.

*Primary Examiner* — Michael Lebentritt
*Assistant Examiner* — Brian Christopher Delrue
(74) *Attorney, Agent, or Firm* — Dority & Manning, P.A.

(57) ABSTRACT

Damper stacks, rotor blades, and turbomachines are provided. A rotor blade includes a main body including a shank and an airfoil extending radially outwardly from the shank. The rotor blade further includes a platform surrounding the main body, the platform comprising a slash face. The rotor blade further includes a damper stack disposed at the slash face and extending generally along an axial direction. The damper stack includes a plurality of damper pins, each of the plurality of damper pins being in contact with a neighboring damper pin.

20 Claims, 5 Drawing Sheets

(56) References Cited

U.S. PATENT DOCUMENTS

| | | | |
|---|---|---|---|
| 8,066,479 B2* | 11/2011 | El-Aini | F01D 5/26 |
| | | | 416/1 |
| 8,267,662 B2 | 9/2012 | Patrick et al. | |
| 8,672,626 B2* | 3/2014 | Boy | F01D 5/26 |
| | | | 416/1 |
| 8,876,478 B2* | 11/2014 | Wassynger | F01D 5/22 |
| | | | 416/190 |
| 9,151,165 B2* | 10/2015 | Donnell | F01D 11/005 |
| 9,175,570 B2* | 11/2015 | Propheter-Hinckley | |
| | | | B22F 10/20 |
| 9,194,238 B2* | 11/2015 | Roberts, III | F01D 25/06 |
| 9,309,782 B2* | 4/2016 | Kareff | F01D 5/22 |
| 9,657,717 B2 | 5/2017 | Ollgaard et al. | |
| 10,385,701 B2* | 8/2019 | Kareff | F01D 5/22 |
| 10,443,408 B2* | 10/2019 | Kareff | F01D 5/22 |
| 2008/0181779 A1* | 7/2008 | Decardenas | F01D 5/22 |
| | | | 416/219 R |
| 2012/0121424 A1* | 5/2012 | Wassynger | F01D 5/22 |
| | | | 416/190 |
| 2014/0147276 A1* | 5/2014 | Roberts, III | F01D 5/3084 |
| | | | 416/135 |
| 2017/0067346 A1 | 3/2017 | Kareff et al. | |
| 2017/0067347 A1* | 3/2017 | Kareff | F01D 5/22 |
| 2017/0067348 A1 | 3/2017 | Kareff et al. | |
| 2017/0067349 A1 | 3/2017 | Kareff et al. | |
| 2017/0067350 A1* | 3/2017 | Kareff | F01D 5/22 |
| 2017/0067351 A1 | 3/2017 | Kareff et al. | |
| 2017/0191366 A1 | 7/2017 | Kareff et al. | |
| 2018/0297136 A1 | 10/2018 | Hoskin et al. | |

* cited by examiner

DAMPER STACKS FOR TURBOMACHINE ROTOR BLADES

FIELD

The present disclosure relates generally to rotor blades for turbomachines and, more particularly, to damper stacks for use internally in rotor blades.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

The compressor section and turbine section generally include a plurality of rotor blades, typically arranged in a plurality of stages. During engine operation, vibrations may be introduced into the rotor blades. For example, fluctuations in flow of the working fluid being compressed or the hot combustion gases or steam may cause the rotor blades to vibrate. One basic design consideration for turbomachine designers is to avoid or minimize resonance with natural frequencies of the rotor blades and the dynamic stresses produced by forced response and/or aero-elastic instabilities, thus controlling high cycle fatigue of the rotor blades.

In order to improve the high cycle fatigue life of a rotor blade, vibration dampers are typically provided below and/or between the platforms to frictionally dissipate vibratory energy and to reduce the corresponding amplitude of vibration during operation. The amount of vibrational energy that is removed by the vibration damper is a function of the dynamic weight of the vibration damper and the reaction loads.

Although known dampers may be largely adequate during typical operations, there is a desire to improve overall damper effectiveness. For example, one issue with many known dampers is that the dampers only provide damping at isolated locations of contact with the associated rotor blades, such as at the ends and perhaps at a central location. Another issue with many known dampers is an inability to conform to complex platform shapes, such as shapes that include curved portions.

Accordingly, improved damper designs are desired in the art. In particular, damper designs that provide improved damping throughout the lengths of the dampers, e.g., by providing increased rotor blade contact, would be advantageous. Further, damper designs that conform to complex platform shapes would be advantageous.

BRIEF DESCRIPTION

Aspects and advantages of the damper stacks, rotor blades, and turbomachines in accordance with the present disclosure will be set forth in part in the following description, or may be obvious from the description, or may be learned through practice of the technology.

In accordance with one embodiment, a rotor blade for a turbomachine is provided. The rotor blade includes a main body including a shank and an airfoil extending radially outwardly from the shank. The rotor blade further includes a platform surrounding the main body, the platform comprising a slash face. The rotor blade further includes a damper stack disposed at the slash face and extending generally along an axial direction. The damper stack includes a plurality of damper pins, each of the plurality of damper pins in contact with a neighboring damper pin.

In accordance with another embodiment, a turbomachine is provided. The turbomachine includes a compressor section, a combustor section, and a turbine section. The turbomachine further includes a plurality of rotor blades provided in at least one of the compressor section or the turbine section. Each of the plurality of rotor blades includes a main body including a shank and an airfoil extending radially outwardly from the shank. Each of the plurality of rotor blades further includes a platform surrounding the main body, the platform comprising a slash face. Each of the plurality of rotor blades further includes a damper stack disposed at the slash face and extending generally along an axial direction. The damper stack includes a plurality of damper pins, each of the plurality of damper pins in contact with a neighboring damper pin.

These and other features, aspects and advantages of the present damper stacks, rotor blades, and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present damper stacks, rotor blades, and turbomachines, including the best mode of making and using the present systems and methods, directed to one of ordinary skill in the art, is set forth in the specification, which makes reference to the appended figures, in which.

DETAILED DESCRIPTION

Figure 1:
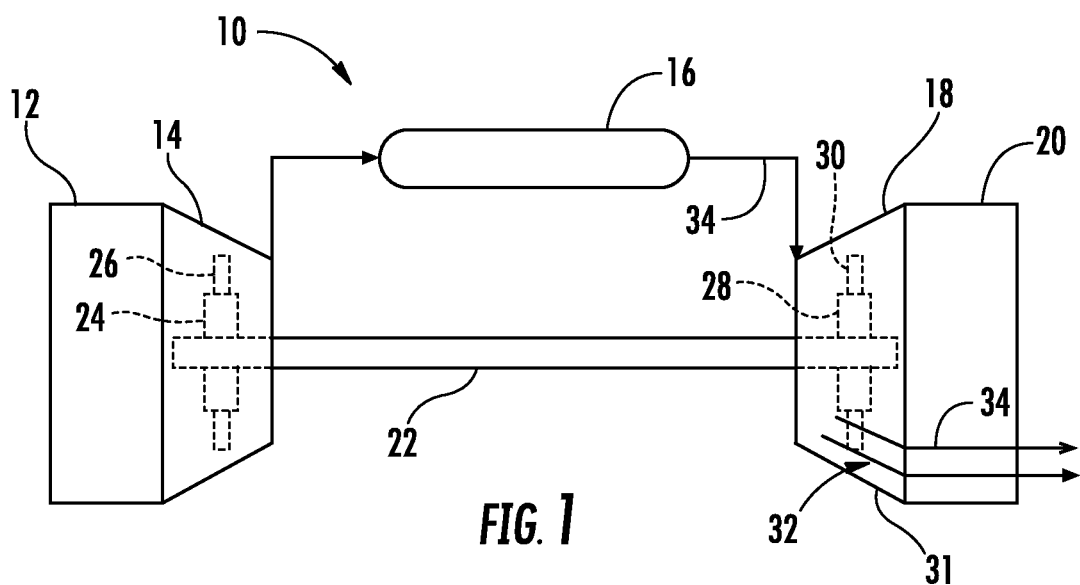
FIG. 1 illustrates a schematic diagram of a turbomachine, in accordance with embodiments of the present disclosure.

Reference now will be made in detail to embodiments of the present damper stacks, rotor blades, and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine, unless otherwise specified in the claims. For example, the damping technology, as described herein, may be used in any type of turbomachine including, but not limited to, a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16 and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustion section 16. The pressurized air is mixed with fuel and burned within each combustor to produce combustion gases 34. The combustion gases 34 flow through the hot gas path 32 from the combustor section 16 into the turbine section 18, where energy (kinetic and/or thermal) is transferred from the combustion gases 34 to the rotor blades 30, thus causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
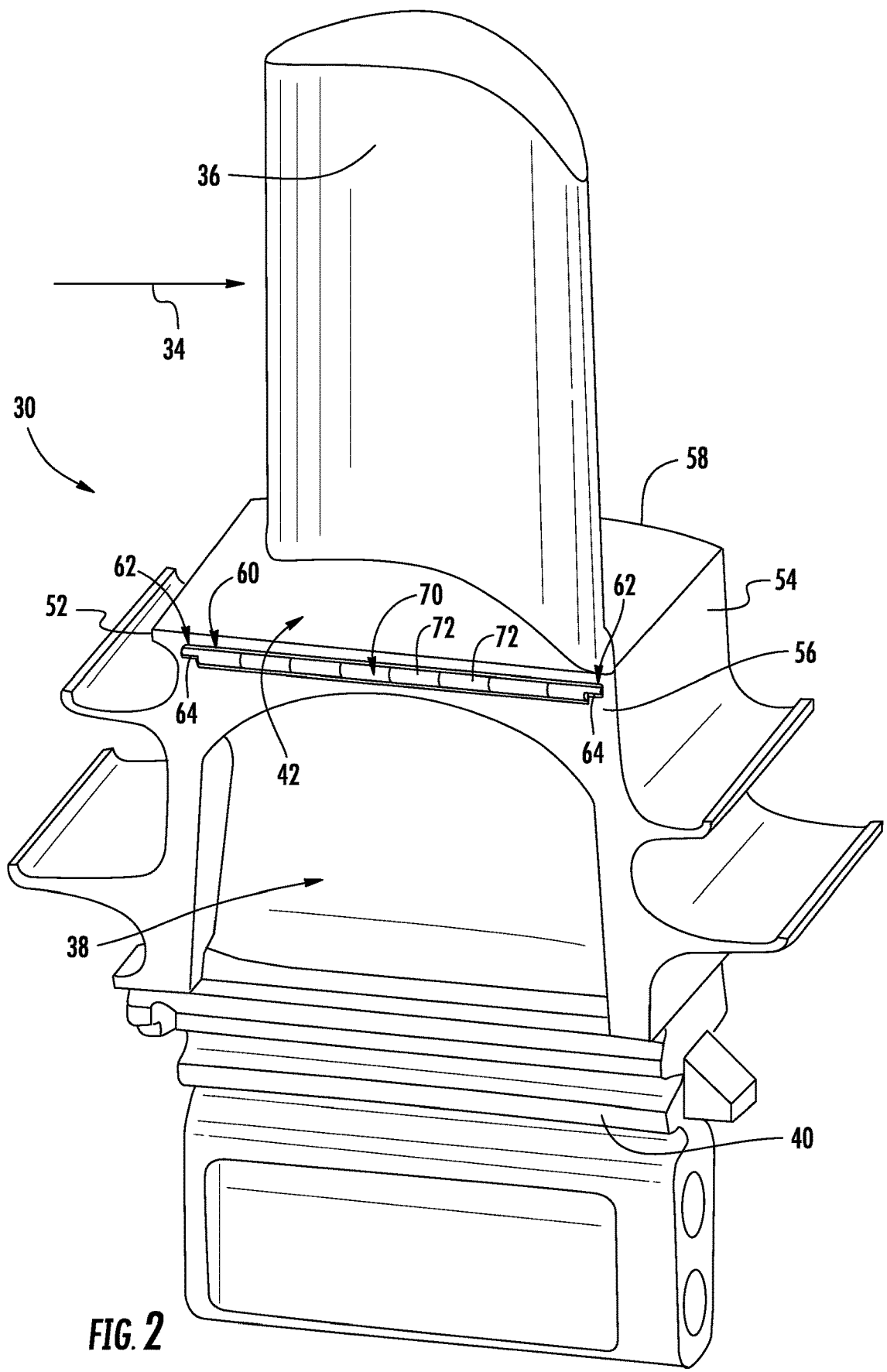
FIG. 2 illustrates a perspective view of a rotor blade, in accordance with embodiments of the present disclosure.
Figure 3:
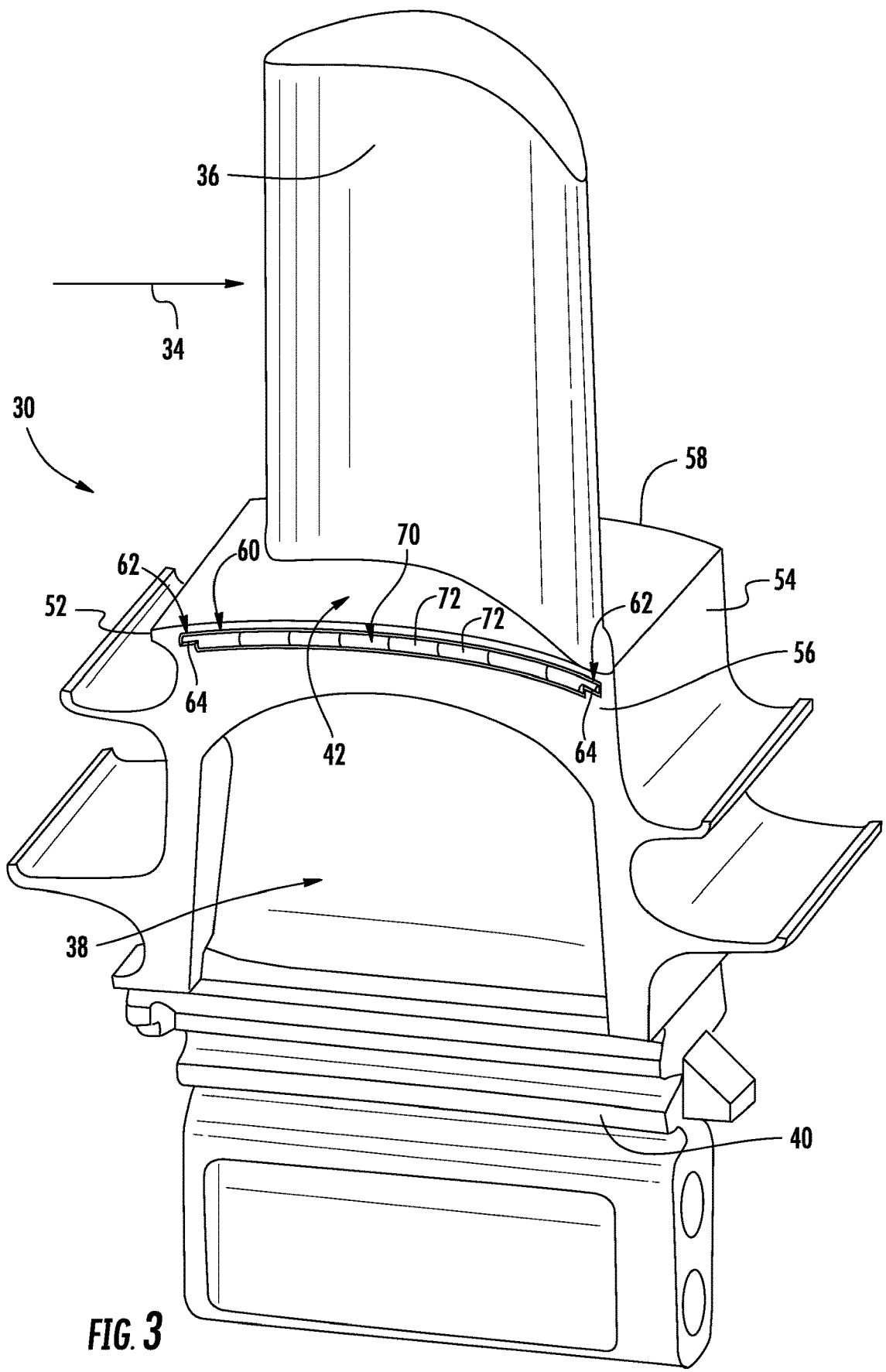
FIG. 3 illustrates a perspective view of a rotor blade, in accordance with other embodiments of the present disclosure.

FIGS. 2 and 3 illustrate embodiments of a rotor blade in accordance with embodiments of the present disclosure. In the embodiment shown, the rotor blade is a turbine blade or bucket 30, although, in alternative embodiments, the rotor blade could be a compressor blade or bucket 26.

The rotor blade 30 may include a body, which includes an airfoil 36 and a shank 38. The airfoil 36 may extend and be positioned radially outwardly from the shank 38. The shank 38 may include a root or dovetail 40, which may attach to the rotor disk 28 to facilitate rotation of the rotor blade 30.

The airfoil 36 may have a generally aerodynamic contour. For example, the airfoil 36 may have an exterior surface defining a pressure side and suction side each extending between a leading edge and a trailing edge. The exterior surface of the shank 38 may include a pressure side face, a suction side face, a leading edge face, and a trailing edge face.

A platform 42 may generally surround the main body. A typical platform may be positioned at an intersection or transition between the airfoil 36 and shank 38 and may extend outwardly in the generally axial and tangential directions, as shown. In the turbine section 18, the platform 42 generally serves as a radially inward flow boundary for the combustion gases 34 flowing through the hot gas path 32. The platform 42 may include a leading edge face 52 axially spaced apart from a trailing edge face 54. The leading edge face 52 is positioned into the flow of combustion gases 34, and the trailing edge face 54 is positioned downstream from the leading edge face 52. Furthermore, the platform 42 may include a pressure-side slash face 56 circumferentially spaced apart from a suction-side slash face 58.

In some embodiments, as illustrated in FIG. 2, the pressure-side slash face 56 and/or suction-side slash face 58 may be generally planar faces (which may be conventionally planar or skewed). In other embodiments, as shown in FIG. 3, the pressure-side slash face 56 and/or suction-side slash face 58 or at least portions thereof may be curviplanar. For example, the slash face 56 and/or 58 may be curved relative to the axial direction, radial direction, and/or tangential direction.

Figure 4:
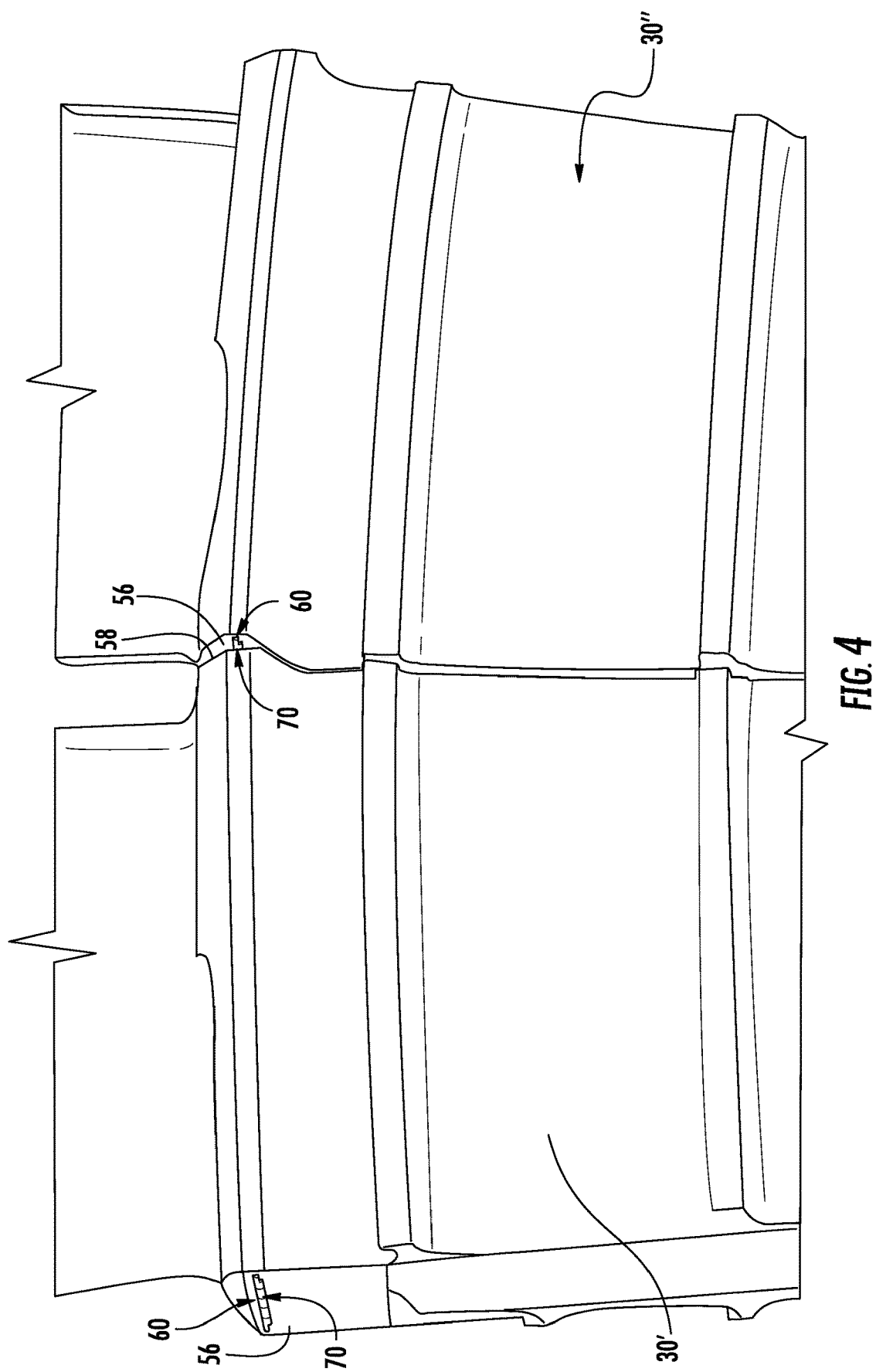
FIG. 4 is a side view illustrating neighboring rotor blades, in accordance with embodiments of the present disclosure.
Figure 5:
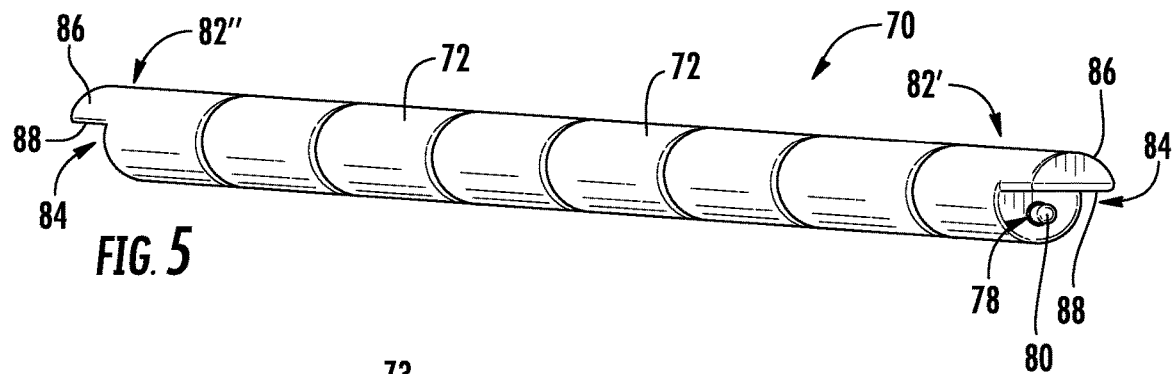
FIG. 5 is a perspective view of a damper stack, in accordance with embodiments of the present disclosure.

As discussed above, a plurality of rotor blades 30 may be provided on each of one or more rotor disks 28 and may extend radially outwardly therefrom. The rotor blades 30 provided on a rotor disk 28 may be assembled in a circumferential array, such that the pressure-side slash face 56 of each rotor blade 30 faces the suction-side slash face 58 of each neighboring rotor blade 30 when the rotor blades 30 are so assembled. FIG. 4 illustrates one pair of circumferentially adjacent, neighboring rotor blades 30', 30". As shown, the pressure-side slash face 56 of a rotor blade 30" faces the suction-side slash face 58 of a neighboring rotor blade 30' when the rotor blades 30', 30" are so positioned.

Referring now to FIGS. 2 through 8, one or more damper stacks 70 may be provided in a groove 60 in a rotor blade 30 in accordance with the present disclosure. Specifically, a groove 60 may be defined in the slash face 56, 58 of the platform 42 of the rotor blade 30. The groove 60 may extend generally along the axial direction. The damper stack 70 may be disposed in the groove 60, as shown in FIGS. 2 and 3. Notably, in exemplary embodiments, a width-wise portion of the damper stack 70 protrudes from the groove 60, such that the damper stack 70 also contacts a groove 60 defined in the neighboring slash face 56, 58 of a neighboring rotor blade 30 when assembled as discussed herein.

Each damper stack 70 may be disposed within and in contact with a slash face 56, 58 (e.g. the pressure-side slash face 56 or suction-side slash face 58) of the rotor blade 30 and may extend generally along the axial direction and thus generally along the length of the respective slash face 56, 58 as shown. Further, as illustrated in FIG. 4, a damper stack 70 in accordance with the present disclosure may be disposed between and in contact with the neighboring, facing, pressure-side slash face 56 or suction-side slash face 58 of a neighboring, circumferentially adjacent rotor blade 30.

Damper stacks 70 in accordance with the present disclosure advantageously serve as vibration dampers. In operation, a damper stack 70 frictionally dissipates vibratory energy and reduces corresponding amplitude of vibration. The amount of vibrational energy that is removed by the damper stack 70 is a function of several factors including, but not limited to, the dynamic weight of the damper stack 70, the geometry of the stack 70, and the reaction loads between the adjacent rotor blades 30', 30".

Each damper stack 70 may include a plurality of damper pins 72 arranged in an end-to-end arrangement corresponding to the linear or curvilinear shape of the groove 60. Each damper pin 72 may be in contact with a neighboring damper pin 72 in the damper stack 70. The use of damper stacks 70 in accordance with the present disclosure advantageously provides improved damping of rotor blades 30 in accordance with the present disclosure. For example, the use of multiple discrete damper pins 72 in the arrangement as shown and described herein advantageously provides improved damping throughout the length of the damper stack 70, due to the discrete movement possible by each damper pin 72 of the damper stack 70 within the groove 60 and by the simultaneous contact of the damper stack 70 with the grooves 60 of adjacent rotor blades 30', 30". Further, such damper stacks 70 and their associated damper pins 72 can conform to complex planar, curviplanar, and/or partially curviplanar platform shapes.

Referring now to FIGS. 5 through 8, various embodiments of damper stacks 70 in accordance with the present disclosure are illustrated. As discussed, a damper stack 70 includes a plurality of damper pins 72. Each damper pin 72 has a length 73, which is defined between a first end 74 and a second end 76 of the damper pin 72. The damper pins 72 may be arranged in a length-wise linear array, such that the neighboring ends 74, 76 of neighboring damper pins 72 contact each other.

For example, the plurality of damper pins 72 may include a first damper pin 72' and a second damper pin 72", each of which extends between a first end 74 and a second end 76. The first end 74 of the first damper pin 72' may contact the second end 76 of the second damper pin 72". In some embodiments, the second end 76 of the first damper pin 72' may contact another neighboring damper pin 72, and/or the first end 74 of the second damper pin 72" may contact yet another neighboring damper pin 72.

Figure 6:
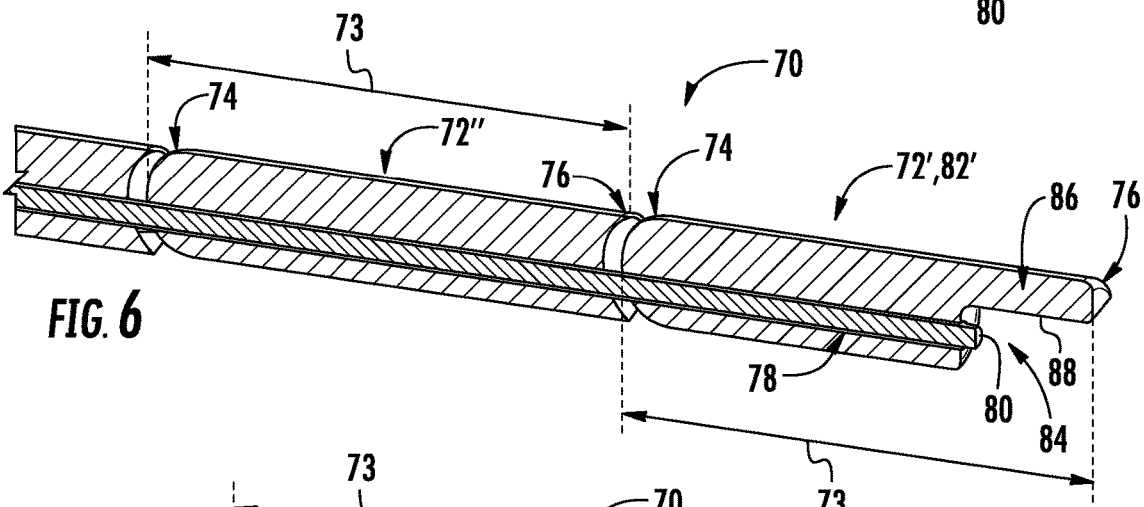
FIG. 6 is a cross-sectional view of a damper stack, in accordance with embodiments of the present disclosure.
Figure 7:
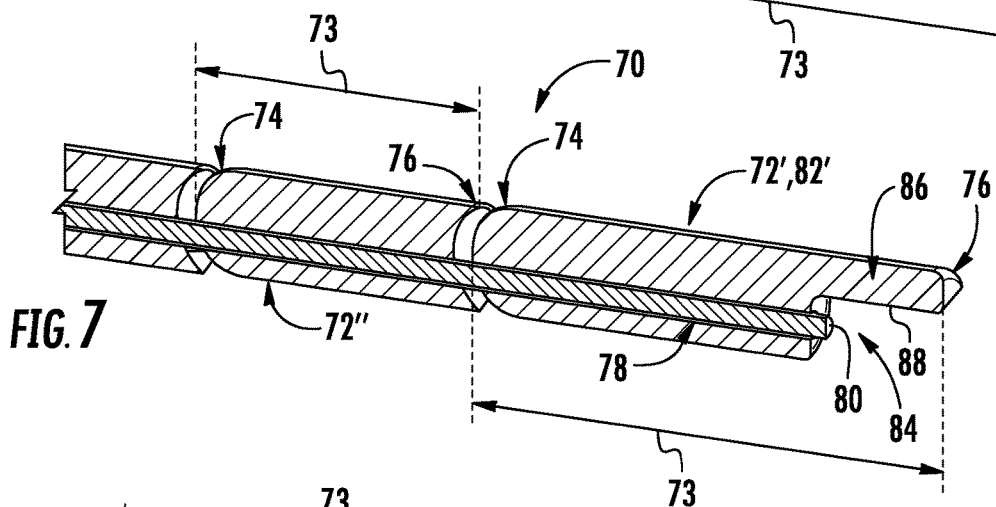
FIG. 7 is a cross-sectional view of a damper stack, in accordance with other embodiments of the present disclosure.
Figure 8:
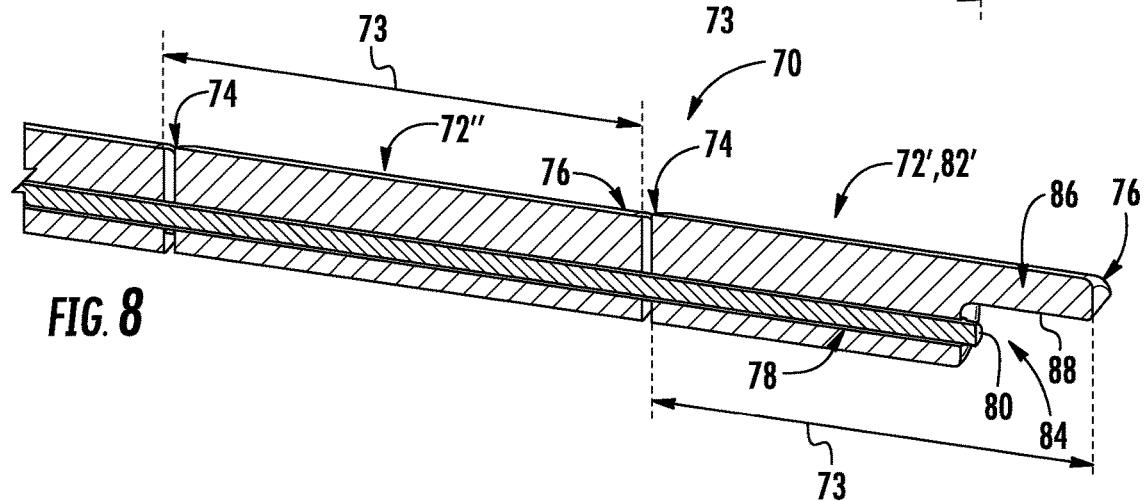
FIG. 8 is a cross-sectional view of a damper stack, in accordance with still other embodiments of the present disclosure.

In addition to the contact with rotor blades 30', 30", the contact between neighboring damper pins 72 may provide a significant damping mechanism for damping of rotor blades 30', 30". Accordingly, the ends 74, 76 of the neighboring damper pins 72 may have suitable shapes that provide such primary damping. In some embodiments, the contacting ends 74, 76 of neighboring damper pins 72 may have complementary spherical shapes. For example, as illustrated in FIGS. 6 and 7, the first end 74 of the first damper pin 72' may have an outward (convex) spherical shape, and the second end 76 of the second damper pin 72" may have an inward (concave) spherical shape, or vice versa. In other embodiments, the contacting ends 74, 76 of neighboring damper pins 72 may have mirrored shapes. For example, as illustrated in FIG. 8, the first end 74 of the first damper pin 72' and the second end 76 of the second damper pin 72" may be flat surfaces that abut against each other. Other suitable end 74, 76 shapes (such as conical, domed, or other complementary shapes) may be utilized, provided such shapes provide suitable primary damping.

Damper pins 72 may, in some embodiments as illustrated, have generally oval or round cross-sectional profiles. Alternatively, other suitably shaped cross-sectional profiles may be utilized. The cross-sectional profile may be constant or may vary along the length 73 of the damper pin 72. Further, damper pins 72 may have any suitable cross-sectional sizes. Still further, damper pins 72 may be formed from any suitable materials. The shapes, sizes, and/or materials may be identical for the plurality of damper pins 72 in a damper stack 70 or may vary for one or more of the damper pins 72 within a damper stack 70.

As discussed, each of the plurality of damper pins 72 may have a length 73. In some embodiments, the lengths 73 of the damper pins 72 in a damper stack 70 may be identical. For example, as shown in FIGS. 6 and 8, the lengths 73 of the first and second damper pins 72', 72" may be identical. In other embodiments, as shown in FIG. 7, the lengths 73 of one or more damper pins 72 in a damper stack 70 may be different from other damper pins 72 in the stack. For example, as shown in FIG. 7, the length 73 of the first damper pin 72' may be different from the length 73' of the second damper pin 72".

In the exemplary illustrated embodiments, each of the plurality of damper pins 72 has a hollow cross-sectional profile, such that an internal passage 78 is defined through the damper pins 72 and damper stack 70. In other embodiments, damper pins 72 and damper stacks 70 in accordance with the present disclosure may be solid, such that no internal passage is defined therethrough.

Further, in some embodiments as shown, a wire 80 may extend through one or more or more damper pins 72 of the damper stack 70. For example, the wire 80 may extend through the internal passages 78 or through separately defined internal passages, thus leaving passages 78 empty. The wire 80 may generally join the damper pins 72 together. In other embodiments, other suitable components may be utilized to join the damper pins 72 together, or the damper pins 72 may not be joined together.

Damper stack 70 may include end pins 82, which are the outermost damper pins 72 on the respective ends of the damper stack 70. End pins 82 are spaced apart from each other along the axial direction. As shown, a damper stack 70 includes a first end pin 82' spaced apart from a second end pin 82" along the axial direction. In some embodiments as shown, a cutout portion 84 may be defined in each such end pin 82', 82", such as in the outermost section of the pin 82', 82" that includes the outermost end 74 or 76, i.e., the end that does not neighbor another pin 72. This cutout portion 84 defines a shoulder 86 of the end pin 82', 82". The shoulder 86 may include a support surface 88, which in exemplary embodiments may be a flat, planar surface.

In some embodiments, the groove 60 includes one or more shoulder slot portions 62, such as at the respective ends of the groove 60. Such portions 62 define support surfaces 64, which in exemplary embodiments may be flat, planar surfaces. In these embodiments, the shoulders 86 of end pins 82', 82" may be disposed in such shoulder slot portions 62, such that the support surfaces 88 may contact the support surfaces 64. Accordingly, the damper stack 70 may be supported in the groove 60, and undesirable rotation during use and operation may be reduced or prevented.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A rotor blade for a turbomachine, the rotor blade comprising:
    a main body comprising a shank and an airfoil extending radially outwardly from the shank;
    a platform surrounding the main body, the platform comprising a slash face; and
    a damper stack disposed at the slash face and extending generally along an axial direction, the damper stack comprising a plurality of damper pins, each of the plurality of damper pins in contact with a neighboring damper pin, wherein each of the plurality of damper pins extends between a first end and a second end, and wherein the first end of a first damper pin of the plurality of damper pins defines a spherical convex shape and the second end of a second damper pin of the plurality of damper pins defines a spherical concave shape, the second end of the second damper pin mating with the first end of the first damper pin.

2. The rotor blade of claim 1, wherein each of the plurality of damper pins extends between the first end having the spherical convex shape and the second end having the spherical concave shape.

3. The rotor blade of claim 1, wherein the first end of the first damper pin has an outward spherical shape, and the second end of the second damper pin has an inward spherical shape.

4. The rotor blade of claim 1, wherein a length of each of the plurality of damper pins is defined between the first end and the second end of the damper pin, wherein the length of one of the damper pins of the plurality of damper pins is different from the length of another of the damper pins of the plurality of damper pins.

5. The rotor blade of claim 1, wherein the damper stack further comprises a wire extending through each of the plurality of damper pins.

6. The rotor blade of claim 1, wherein a groove is defined in the slash face, and wherein the damper stack is partially disposed in the groove.

7. The rotor blade of claim 1, wherein the plurality of damper pins comprises a first end pin and a second end pin, the first end pin spaced apart from the second end pin along the axial direction, the first end pin and the second end pin each comprising a shoulder defined by a cutout portion.

8. The rotor blade of claim 7, wherein each of the shoulders comprises a flat support surface.

9. The rotor blade of claim 8, wherein a groove is defined in the slash face, wherein the damper stack is partially disposed in the groove, and wherein each of the shoulders is disposed in a shoulder slot portion of the groove.

10. A turbomachine, comprising:
    a compressor section;
    a combustor section;
    a turbine section;
    a plurality of rotor blades provided in at least one of the compressor section or the turbine section, each of the plurality of rotor blades comprising:
        a main body comprising a shank and an airfoil extending radially outwardly from the shank;
        a platform surrounding the main body, the platform comprising a slash face; and
        a damper stack disposed at the slash face and extending generally along an axial direction, the damper stack comprising a plurality of damper pins, each of the plurality of damper pins in contact with a neighboring damper pin, wherein each of the plurality of damper pins extends between a first end and a second end, and wherein the first end of a first damper pin of the plurality of damper pins defines a spherical convex shape and the second end of a second damper pin of the plurality of damper pins defines a spherical concave shape, the second end of the second damper pin mating with the first end of the first damper pin.

11. The turbomachine of claim 10, wherein each of the plurality of damper pins extends between the first end having the spherical convex shape and the second end having the spherical concave shape.

12. The turbomachine of claim 10, wherein the first end of the first damper pin has an outward spherical shape, and the second end of the second damper pin has an inward spherical shape.

13. The turbomachine of claim 10, wherein a length of each of the plurality of damper pins is defined between the first end and the second end of the damper pin, wherein the length of one of the damper pins of the plurality of damper pins is different from the length of another of the damper pins of the plurality of damper pins.

14. The turbomachine of claim 10, wherein the damper stack further comprises a wire extending through each of the plurality of damper pins.

15. The turbomachine of claim 10, wherein a groove is defined in the slash face, and wherein the damper stack is partially disposed in the groove.

16. The turbomachine of claim 10, wherein the plurality of damper pins comprises a first end pin and a second end pin, the first end pin spaced apart from the second end pin along the axial direction, the first end pin and the second end pin each comprising a shoulder defined by a cutout portion.

17. The turbomachine of claim 16, wherein each of the shoulders comprises a flat support surface.

18. The turbomachine of claim 17, wherein a groove is defined in the slash face, wherein the damper stack is partially disposed in the groove, and wherein each of the shoulders is disposed in a shoulder slot portion of the groove.

19. The turbomachine of claim 10, wherein the plurality of rotor blades is provided in the turbine section.

20. The turbomachine of claim 10, wherein the turbomachine is a gas turbine.

* * * * *